(12) United States Patent
Oka et al.

(10) Patent No.: US 6,352,316 B1
(45) Date of Patent: Mar. 5, 2002

(54) BRAKE SYSTEM

(75) Inventors: Hiroyuki Oka; Yoshiyasu Takasaki; Masahiro Shimada, all of Saitama-ken (JP)

(73) Assignees: Bosch Braking Systems Co., Ltd., Tokyo; Denso Corporation, Kariya, both of (JP)

( * ) Notice: Subject to any disclaimer, the term of this patent is extended or adjusted under 35 U.S.C. 154(b) by 0 days.

(21) Appl. No.: 09/542,705

(22) Filed: Apr. 3, 2000

(30) Foreign Application Priority Data

Apr. 23, 1999 (JP) .......................... 11-115923
Jan. 28, 2000 (JP) .......................... 12-019546

(51) Int. Cl.⁷ .............................................. B60T 8/44
(52) U.S. Cl. ................................ 303/114.3; 303/113.3; 303/116.1; 60/552; 91/434
(58) Field of Search .................... 303/113.1, 113.3, 303/114.3, 114.1, 114.2, 116.1, 116.4, 119.1; 60/552, 553, 555, 560, 574; 91/369.1, 376 R, 434

(56) References Cited

U.S. PATENT DOCUMENTS

| | | | | |
|---|---|---|---|---|
| 4,892,361 A | * | 1/1990 | Nishii et al. | 303/114.1 |
| 5,735,124 A | * | 4/1998 | Cords et al. | 60/548 |
| 5,802,952 A | * | 9/1998 | Ikeda | 91/369.1 |
| 5,918,462 A | * | 7/1999 | Mitani | 60/397 |
| 6,161,464 A | * | 12/2000 | Oka et al. | 91/369.1 |
| 6,183,049 B1 | * | 2/2001 | Oka et al. | 303/114.1 |

FOREIGN PATENT DOCUMENTS

| | | | |
|---|---|---|---|
| JP | 9267741 A | * | 10/1997 |
| JP | 10-35477 | | 2/1998 |
| JP | 10-152041 | | 6/1998 |
| JP | 10167046 A | * | 6/1998 |

* cited by examiner

Primary Examiner—Pam Rodriguez
(74) Attorney, Agent, or Firm—Flynn, Thiel, Boutell & Tanis, P.C.

(57) ABSTRACT

A brake system including a negative pressure booster, a master cylinder of tandem type and an intensifying arrangement. The intensifying arrangement defines an intensifying chamber disposed rearward of a primary piston, a pump for supplying a braking liquid to the intensifying chamber, and a reaction piston and a sleeve for controlling the pressure of the braking liquid which is supplied to the intensifying chamber. As a brake pedal is depressed and the intensifying arrangement is actuated, a sum of an urging force from the negative pressure booster and an urging force from the intensifying arrangement operates the primary piston to develop a master cylinder pressure. The sum is proportional to the input or a force depressing the brake pedal. In this manner, a simple arrangement assures a satisfactory booster function even after the negative pressure booster has reached a full load point or the limit of its assistance or in the event of the failure of a source of a negative pressure for the negative pressure booster.

17 Claims, 11 Drawing Sheets

BRAKE SYSTEM

FIELD OF THE INVENTION

The present invention relates to a brake system including a brake booster which boosts a braking liquid pressure, and more particularly, to a brake system which permits a boosting operation after the brake booster has reached a full load point so as to maintain the master cylinder pressure as before the full load point is reached.

DESCRIPTION OF THE PRIOR ART

A brake system is known in the art which permits a braking liquid pressure to be boosted even after a brake booster has reached a full load point (see Japanese Laid-Open Patent Application No. 152,041/1998). This cited Application discloses an embodiment shown in FIGS. 2 and 3 of the cited application in which a solenoid operated pressure control valve 22 and a pump 16 are provided in a braking liquid passage extending between a master cylinder and a wheel cylinder so that a liquid pressure from the pump 16 is acting in a portion of the braking liquid passage located nearer the wheel cylinder than the pressure control valve. This allows the braking liquid pressure to be increased relative to a brake operating force, enabling the braking force to be boosted after the full load point of, or the limit of assistance by the brake booster. This also assures that a required braking force can be obtained in the event the brake booster fails to operate as a result of a drop in the pressure of a source of pressure for the brake booster.

The above cited Application also discloses an embodiment in FIGS. 13 and 14 of the cited application in which the solenoid operated pressure control valve 22 shown in FIGS. 2 and 3 of the cited application is replaced by a mechanical pressure control valve 150. Again, a boosting of a braking force is enabled subsequent to the full load point of the brake booster.

A brake system which permits the braking liquid pressure to be boosted subsequent to the braking booster reaching the full load point is also known from Japanese Laid-Open Patent Application No. 35,477/1998, which discloses a system including, in addition to a master cylinder and a brake booster, an intermediate liquid pressure controller 154 for use when the limit of assistance is reached, the controller being disposed rearward of the master cylinder for enabling a boosting of a braking force subsequent to the full load point of the brake booster.

The system disclosed in FIGS. 2 and 3 of the first cited Application requires a variety of sensors and a solenoid operated pressure control valve, and disadvantageously results in a complicated and expensive arrangement. The system also disclosed in FIGS. 13 and 14 of the same Application suffers from a drawback that the assistance is prohibited if the brake booster fails to operate due to a drop in the pressure of a source of pressure for the brake booster.

The brake system disclosed in the second cited Application also suffers from the same drawback that the assistance is prohibited if the brake booster fails to boost due to a drop in the pressure of a source of pressure for the brake booster.

SUMMARY OF THE INVENTION

It is an object of the present invention to provide a brake system which uses a relatively simple arrangement to permit a braking force to be boosted subsequent to the full load point of or the limit of assistance by the brake booster and to enable the assistance if the brake booster fails to boost due to a depression or drop in the pressure of a source of pressure for the brake booster.

Specifically, the present invention provides a brake system comprising a master cylinder defined in a housing for developing a master cylinder pressure as an associated master cylinder piston disposed therein advances, a negative pressure booster actuated by a brake operating member to develop an output which in turn causes the master cylinder piston to advance, and intensifying means for intensifying the master cylinder pressure by causing the master cylinder piston to advance, the arrangement being such that a sum of a force with which the intensifying means urges the master cylinder piston to advance and a force with which the output from the negative pressure booster urges the master cylinder piston to advance is in proportion to an input to the brake operating member.

With this arrangement, it is possible to develop a master cylinder pressure after the negative pressure booster has reached the full load point or the limit of assistance at the same ratio as before the full load point is reached. If a source of pressure for the brake booster fails and the brake booster fails to boost, a master cylinder pressure can be developed in the similar manner as when the source of pressure is normal.

In this manner, a brake system can be provided which uses a relatively simple arrangement to allow a braking force to be boosted subsequent to the full load point or the limit of assistance of the brake booster while also enabling the assistance if the brake booster fails to boost due to a depression in the pressure of a source of pressure for the brake booster.

Above and other objects, features and advantages of the invention will become apparent from the following description of several embodiments thereof with reference to the attached drawings.

DETAILED DESCRIPTION OF THE EMBODIMENTS

Figure 1:
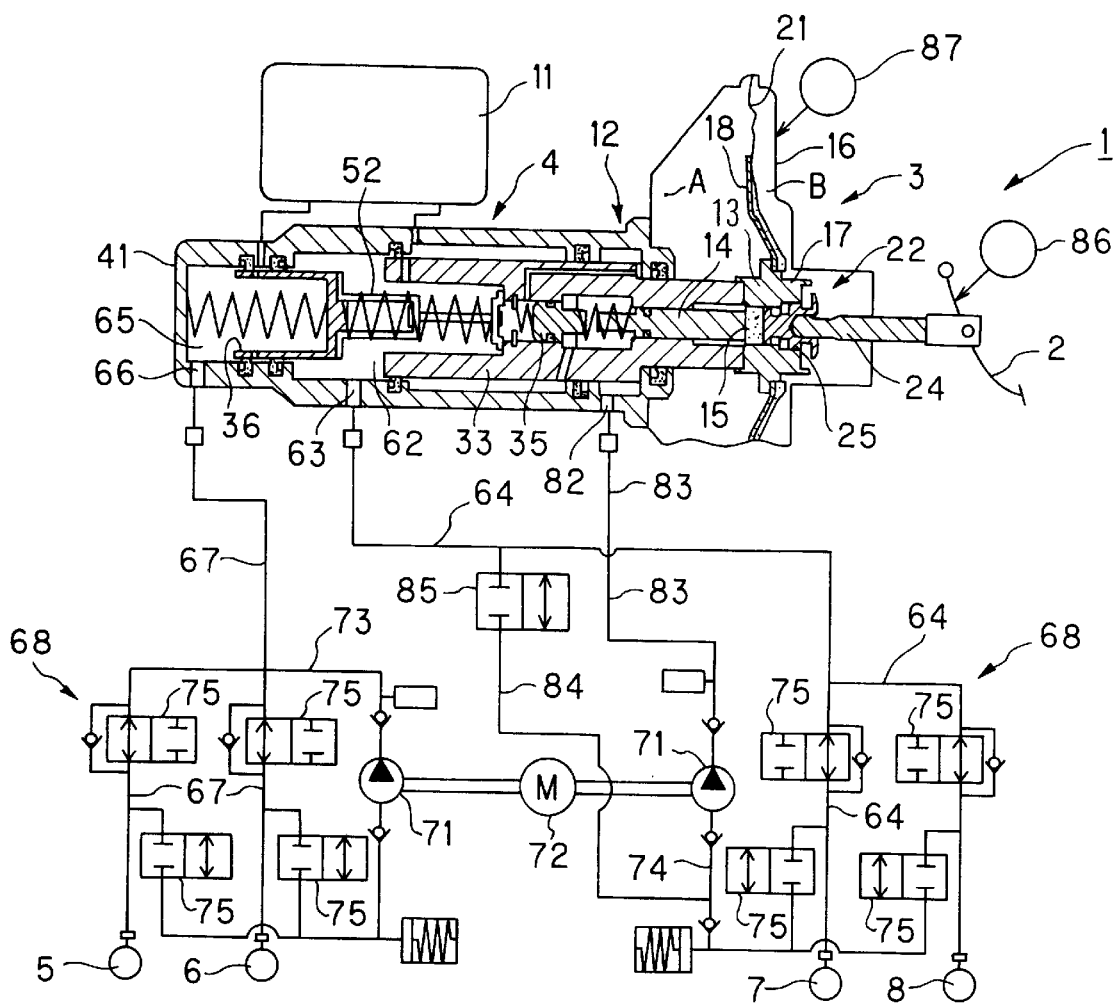
FIG. 1 is an overall schematic view of one embodiment of the invention.

Several embodiments of the invention will now be described with reference to the drawings. Referring to FIGS.

1 and 2, a brake system 1 according to the present invention comprises a negative pressure booster 3 which boosts a force of depression applied to a brake pedal 2 to provide an output, a master cylinder 4 actuated by an output from the negative pressure booster 3 to develop a master cylinder pressure, wheel cylinders 5 to 8 which are supplied with the master cylinder pressure from the master cylinder 4 to actuate respective brakes, a reservoir 11 of a braking liquid, and intensifying means 12 disposed rearward of the master cylinder 4 for intensifying the master cylinder pressure.

Figure 2:
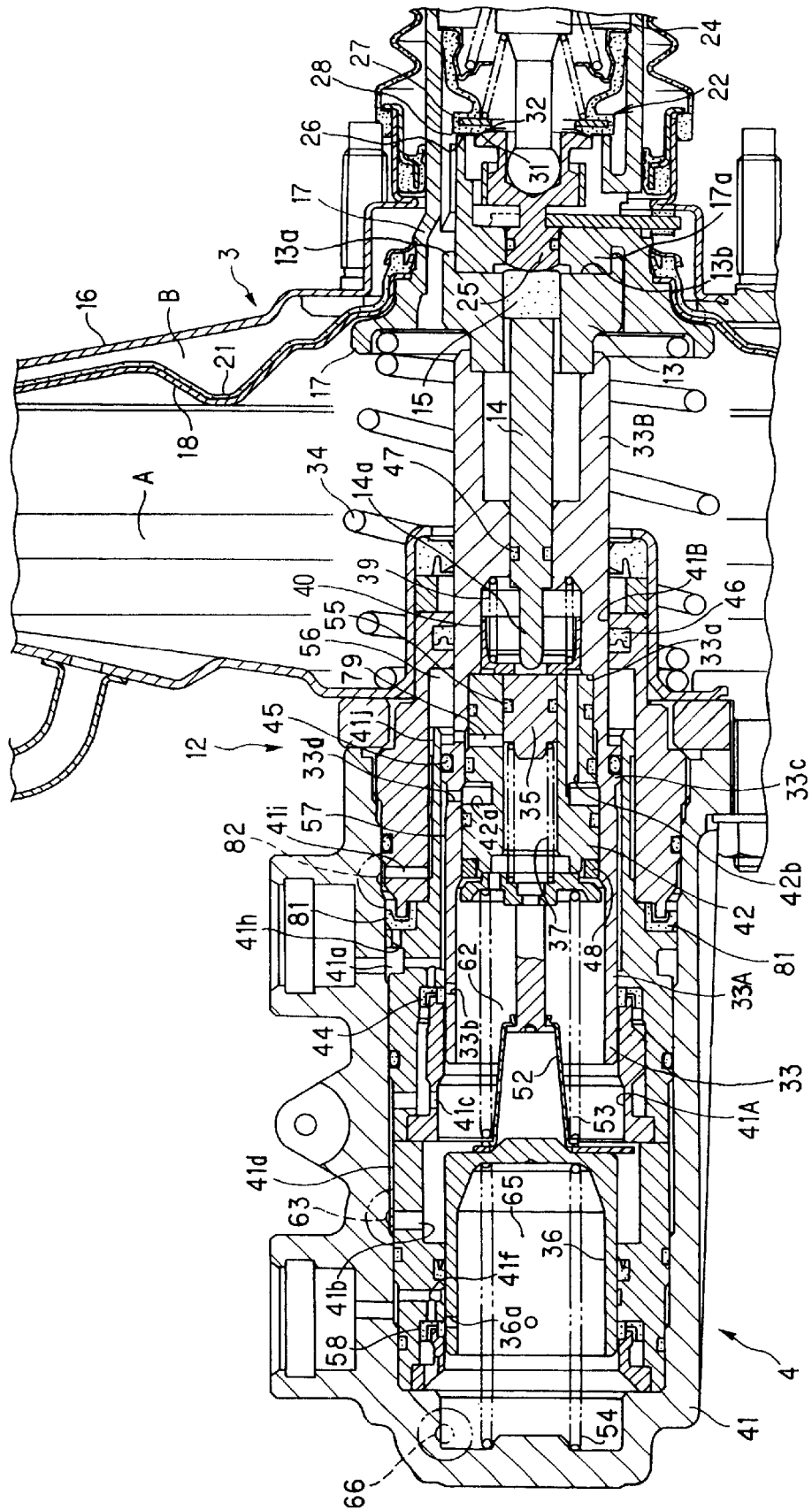
FIG. 2 is an enlarged cross section of an essential part shown in FIG. 1.

As shown in detail in FIG. 2, the negative pressure booster 3 is constructed in the similar manner as known in the art except for the construction of an output shaft 13, an intermediate rod 14 which is fitted therein and a buffering member 15 which is disposed rearward thereof Specifically, slidably disposed within a shell 16 is a substantially tubular valve body 17, and a power piston 18 and a diaphragm are mounted on the outer periphery of the valve body 17. A constant pressure chamber A and a variable pressure chamber B are defined across the diaphragm 21, and a negative pressure is normally introduced into the constant pressure chamber A from a source of negative pressure. A valve mechanism 22, which is known in itself in the art, is contained within the valve body 17. The valve mechanism 22 comprises a valve plunger 25 which is sidably fitted into the valve body 17 and connected to an input shaft 24, a vacuum valve 28 formed by a combination of a vacuum valve seat 26 formed around the inner periphery of the valve body 17 and a valve element 27 disposed for movement into engagement with or disengagement from the valve seat, and an atmosphere valve 32 formed by a combination of an atmosphere valve seat 31 formed on a rear portion of the valve plunger 25 and the valve element 27 disposed for movement into engagement with or disengagement from the valve seat 31.

In distinction to a conventional output shaft, the output shaft 13 of the present embodiment is formed with a through-opening extending along the axis thereof so as to be tubular in configuration. Toward the rear end, the output shaft 13 is formed with an annular projection 13a around its outer periphery, and the annular projection 13a is fitted around an annular projection 17a formed on the valve body 17. The output shaft 13 has a rear end face 13b which is disposed in abutment against the end face of the annular projection 17a. On the other hand, a front end of the output shaft 13 is fitted into the inner periphery of a primary piston 33 associated with a master cylinder 4 at its rear end. In this manner, in the present embodiment, the output shaft 13 is integrally connected with the valve body 17, and substantially forms part of the valve body 17.

As will be described in further detail, the primary piston 33 associated with the master cylinder 4 of the present embodiment is also formed with a through-opening extending along the axis thereof to be tubular in configuration. The intermediate rod 14 is slidably fitted into both the primary piston 33 and the output shaft 13. The output shaft 13 has an internal diameter which is substantially equal to the external diameter of the front end of the valve plunger 25. The buffering member 15 is in the form of a solid cylinder of an elastomer, and is fitted into the output shaft 13 from the rear side so that the buffering member 15 is held sandwiched between the rear end of the intermediate rod 14 and the front end of the valve plunger 25.

It will be understood from the foregoing description that in the present embodiment, a reaction disc is not provided between the end face of the annular projection 17a of the valve body 17 and the end face 13b of the output shaft 13 in distinction to the prior art. Accordingly, a brake reaction from the master cylinder 4 as the negative pressure booster 3 is actuated is transmitted through the intermediate rod 14, the buffering member 15, the valve plunger 25 and the input shaft 24 to the brake pedal 2. A pulsation from a pump 71 acting upon the intermediate rod 14 is absorbed by the buffering member 15, thus preventing it from being transmitted to the valve plunger 25. It will be seen that the buffering member 15 may be omitted, and in such instance, the rear end of the intermediate rod 14 may be disposed in direct abutment against the front end of the valve plunger 25.

In the inoperative condition where the brake pedal 2 is not depressed, the valve body 17 and the like are situated in the inoperative position shown by a return spring 34. In this condition, the valve element 27 is removed from the vacuum valve seat 26 and the vacuum valve 28 is opened while the valve element 27 is seated on the atmosphere valve seat 31 and the atmosphere valve 32 is closed.

Figure 3:
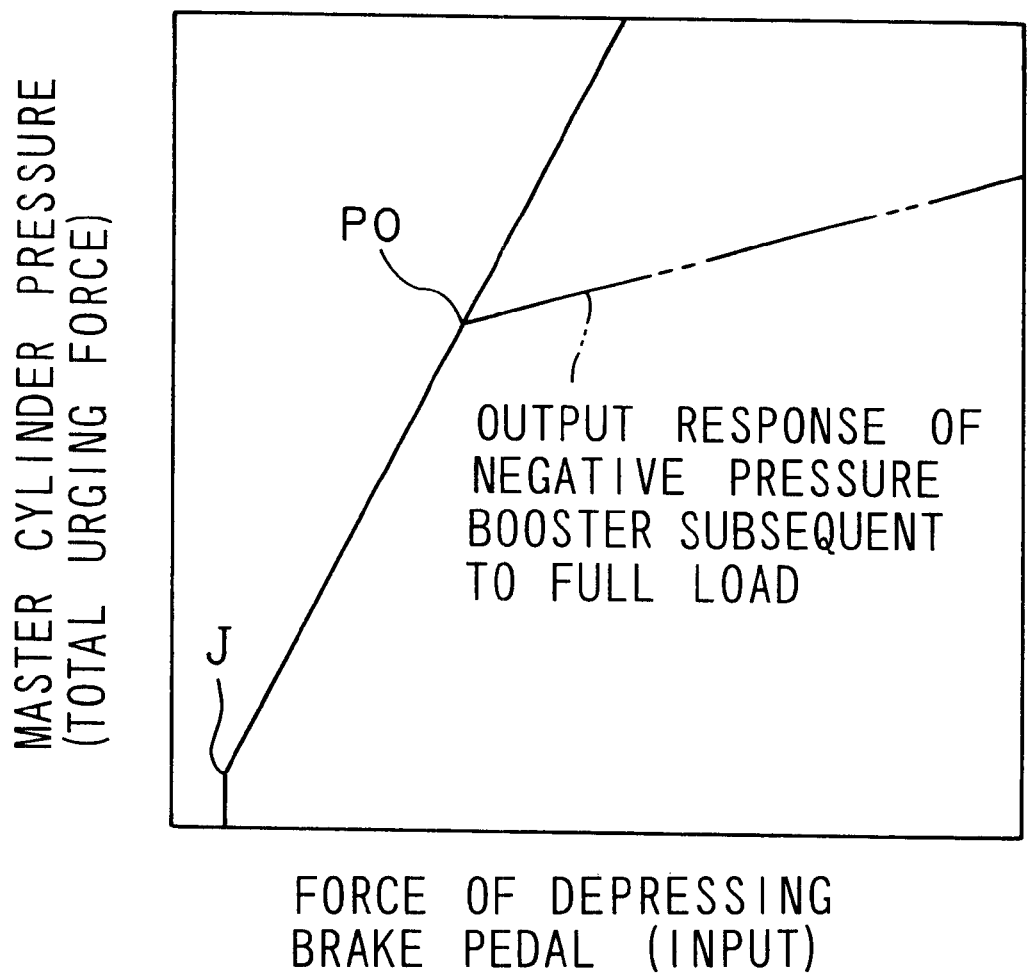
FIG. 3 graphically illustrates a response diagram representing a relationship between an input and a master cylinder pressure obtained with the brake system shown in FIG. 1.

If the brake pedal 2 is now depressed, the input shaft 24 and the valve plunger 25 are driven forward, whereby the valve element 27 becomes seated upon the vacuum valve seat 26 to close the vacuum valve 28 while it is removed from the atmosphere valve seat 31 to open the atmosphere valve 32. In this manner, the atmosphere is introduced into the variable pressure chamber B, and the pressure differential between the negative pressure within the constant pressure chamber A and the atmosphere within the variable pressure chamber B drives the power piston 18 and the valve body 17 forward, thus providing an output from the output shaft 13. The output from the output shaft 13 causes the primary piston 33 associated with the master cylinder 4 to advance, thus developing a master cylinder pressure. At this time, a reaction from the master cylinder 4 is transmitted through a reaction piston 35, the intermediate rod 14, the buffering member 15, the valve plunger 25 and the input shaft 24 to the brake pedal 2, and the master cylinder pressure is controlled in accordance with an input applied to the brake pedal 2 as illustrated in FIG. 3. Specifically, the master cylinder pressure is controlled so that a force acting upon the reaction piston 35 disposed within the primary piston 33, which will be described later, under the influence of the master cylinder pressure is balanced with the input applied to the brake pedal 2.

In the present embodiment, the master cylinder 4 is of tandem type as shown in greater detail in FIG. 2 and comprises the primary piston 33 which is disposed rearward within a housing 41 and a secondary piston 36 disposed forwardly within the housing 41, in a similar manner as known in the art. The housing 41 for the master cylinder 4 includes a larger diameter bore 41A having differing internal diameters at various axial positions, and a smaller diameter bore 41B which continues from the larger diameter bore 41A and extends through the rear end face.

The secondary piston 36 is substantially cup-shaped as in the prior art, and is sidably fitted into the inner periphery of the larger diameter bore 41A toward the front end thereof.

By contrast, the primary piston 33 of the present embodiment is unlike a conventional one, and is generally formed as a stepped cylinder having a series of stepped through-openings, into which a jumping spring 39, a retainer 40 and a sleeve 42 are sequentially inserted from the front side to maintain the rear end face of the sleeve 42 in abutment against a stepped end face 33a to be secured in place by a retainer 48. The sleeve 42 has a through-opening into which the reaction piston 35 is slidably inserted, and a reaction piston return spring 37 is disposed between a retainer 52 for a primary piston return spring 53, which is in itself known in the art and which abuts against the front end face of the sleeve 42, and the reaction piston 35. The resilience of the jumping spring 39 is chosen to be greater than the resilience of the reaction piston return spring 37. Accordingly, in the inoperative operation, the retainer 40 abuts against the rear end face of the sleeve 42 and the reaction piston 35 abuts against the retainer 40. It will be noted that the reaction piston 35 is provided with a seal member 55 to maintain the liquid tightness between the outer periphery of the reaction piston 35 and the inner periphery of the sleeve 42.

The primary piston 33 includes a larger diameter portion 33A disposed toward the axial front end and a smaller diameter portion 33B disposed toward the axial rear end, and is formed with an annular projection 33C of a greater diameter than the larger diameter portion 33A around its outer periphery in a region located between the larger diameter portion 33A and the smaller diameter portion 33B. The front larger diameter portion 33A and the annular projection 33C of the primary piston 33 are slidably inserted into the larger diameter bore 41A of the housing 41, while the rear smaller diameter portion 33B of the primary piston 33 is slidably inserted into the smaller diameter bore 41B of the housing 41. A cup seal 44 is disposed at a central axial position in the larger diameter bore 41A of the housing 41 to maintain the liquid tightness between the outer peripheral surface of the front larger diameter portion 33A of the primary piston 33 and the inner periphery of the larger diameter bore 41A. A seal member 45 is disposed around the outer periphery of the annular projection 33C of the primary piston 33 to maintain the liquid tightness between the outer periphery of the annular projection 33C and the inner periphery of the larger diameter bore 41A. In addition, a cup seal 46 is provided in the smaller diameter bore 41B of the housing 41 to maintain the liquid tightness between the outer periphery of the smaller diameter portion 33B of the primary piston 33 and the inner periphery of the smaller diameter bore 41B of the housing 41.

The retainer 52 for the spring 53 is axially telescoping as is known in the art and is provided between the secondary piston 36 and the sleeve 42. The return spring 53 is disposed between a front radial portion and a rear radial portion of the retainer 52. A return spring 54 is disposed between the front side of the secondary piston 36 and the bottom surface of the housing 41. Accordingly, in the inoperative condition, the secondary piston 36 and the primary piston 33 assume their inoperative positions shown which are rearmost within the larger diameter bore 41A.

An internal space within the larger diameter bore 41A of the housing 41 which is located rearward of the annular projection 33C on the primary piston 33 defines an intensifying chamber 56, an internal space within the larger diameter bore 41A of the housing located between the primary piston 33 and the secondary piston 36 defines a first liquid pressure chamber 62, and an internal space within the larger diameter bore 41A of the housing 41 located forwardly of the secondary piston 36 defines a second liquid pressure chamber 65. An annular space 57 between the outer peripheral surface of the larger diameter portion 33A of the primary piston 33 and the inner peripheral surface of the larger diameter bore 41A of the housing 41 in a region between the cup seal 44 and the seal member 45 communicates with the reservoir 11 through a path 41a formed in the housing 41.

The outer periphery of the front portion of the intermediate rod 14 is slidably fitted into the smaller diameter portion 33B of the primary piston 33, and a seal member 47 provided around the outer periphery of the intermediate rod 14 maintains the liquid tightness between the inner peripheral surface of the smaller diameter portion 33B of the primary piston 33 and the outer peripheral surface of the intermediate rod 14. The rear end face of the smaller diameter portion 33B of the primary piston 33 abuts against the front end face of the output shaft 13 of the negative pressure booster 3 while the rear end face of the intermediate rod 14 abuts against the front end face of the buffering member 15, and the front end face of the intermediate rod 14 is positioned at a given clearance from the rear end face of the reaction piston 35 in the inoperative position.

The intensifying chamber 56 is connected to a communicating opening 82 through an axial path 41j and a radial path 41i formed in the housing 41, and thence passes through a conduit 83 and a check valve, which permits a flow of a braking liquid only in a direction from the pump 71 to the intensifying chamber 56, to the discharge side of the pump 71. The radial path 41i in the housing 41 is connected to the reservoir 11 through a cup seal 81 which serves as a check valve and through a path 41h, thus allowing a flow of braking liquid only in a direction from the reservoir 11 to the intensifying chamber 56. The intensifying chamber 56 is also connected to the first liquid chamber 62 through a radial bore 79 extending through the primary piston 33 and the sleeve 42, and communicates with the first liquid pressure chamber 62 in the inoperative condition.

Toward the front end of the larger diameter portion 33A, the primary piston 33 is formed with a radial bore 33b which provides a communication between the internal space representing the first liquid pressure chamber 62 and a space outside the outer periphery thereof, and in the inoperative condition shown, an outer opening of the radial bore 33b is positioned to axially straddle the rear end face of the cup seal 44. In the inoperative condition, the radial bore 33b is connected to the reservoir 11 through the annular space 57 defined between the outer peripheral surface of the primary piston 33 at a location rearward of the cup seal 44 and the inner peripheral surface of the larger diameter bore 41A and through the radial bore 41a.

The first liquid pressure chamber 62 communicates with a first discharge port 63 through radial bores 41b, 41c and annular opening 41d formed in the housing 41, and communicates with the wheel cylinders 7 and 8 through a conduit 64. Accordingly, upon actuation, as the primary piston 33 moves forward to allow the radial bore 33b in the primary piston 33 to cross the cup seal 44, a master cylinder pressure is developed in the first liquid pressure chamber 62, and thus the braking liquid in the first liquid pressure chamber 62 can be supplied to the wheel cylinders 7 and 8 through the first discharge port 63 and the conduit 64.

Toward the front end, the secondary piston 36 is formed with a radial bore 36a which provides a communication between the internal space representing the second liquid pressure chamber 65 and the space outside the outer periphery thereof, and in the inoperative condition shown, an outer opening of the radial bore 36a is positioned to axially straddle the rear end face of the cup seal 58. In this inoperative condition, the radial bore 36a is connected to the reservoir 11 through a space between the outer peripheral surface of the secondary piston 36 at a location rearward of the cup seal 58 and the inner peripheral surface of the larger diameter bore 41A of the housing 41 and through a radial bore 41f.

The second liquid pressure chamber 65 communicates with the wheel cylinders 5 and 6 through a second discharge port 66 and a conduit 67. Accordingly, upon actuation, as the secondary piston 36 moves forward and the radial bore 36a in the secondary piston 36 crosses the cup seal 58, a master cylinder pressure is developed in the second liquid pressure chamber 65, and the braking liquid within second liquid pressure chamber 65 can be supplied to the wheel cylinders 5 and 6 through the second discharge port 66 and the conduit 67.

The annular space 57 formed between the outer peripheral surface of the primary piston 33 and the inner peripheral surface of the larger diameter bore 41A of the housing 41 communicates with a chamber for the spring 39 through radial bore 33d through the primary piston 33, an annular groove 42a formed in the outer periphery of the sleeve 42 and an axial bore 42b, and thus the chamber for the spring 39 is normally in communication with the reservoir 11.

In the present embodiment, liquid pressure control means 68, which is known in itself to provide an antiskid control, are provided in the conduits 64 and 67. Each of the liquid control means comprises the pump 71, a motor 72 which operates the pump, a conduit 73 or 74 which connects between the pump 71 and the conduit 64 or 67, and a plurality of solenoid operated open/close valves 75. A controller, not shown, controls the motors 72 and open/close valves 75 to provide an antiskid control. In the present embodiment, the pump 71 which supplies the braking liquid to the intensifying chamber 56 also serves as the antiskid controlling pump, and thus, the discharge side of the pump 71 communicates with the intensifying chamber 56, through a conduit 83 and a conduit 84 is provided to connect between a point in the conduit 64 which is located nearer the master cylinder 4 than the liquid pressure control means 68 and the suction side of the pump 71, and a normally closed, solenoid operated open/close valve 85 is disposed in the conduit 84.

In the present embodiment, the intensifying means 12 comprises the intensifying chamber 56, the pump 71 for supplying the braking liquid thereto, the solenoid operated open/close valves 85 for supplying the braking liquid to the suction side of the pump 71, and the sleeve 42 and the reaction piston 35 provided within the primary piston 33. The sleeve 42 and the reaction piston 35 constitute together a control valve for the intensifying means 12 which controls the liquid pressure from the pump 71 which is supplied to the intensifying chamber 56.

As shown in FIG. 1, in the present embodiment, there is provided a switch 86 which detects the depression of the brake pedal 2, and an output therefrom is delivered to a controller not shown. There is also provided a pressure sensor 87 which detects the pressure within the variable pressure chamber B of the negative pressure booster 3, and the sensor delivers an output representing the pressure within the variable pressure chamber B of the negative pressure booster 3 to the controller, not shown. The controller, not shown, controls the operation of the pump 71 and the normally closed, solenoid operated open/close valves 85 in response to the inputs from the switch 86 and pressure sensor 87.

In the present embodiment, the axial travel of the input shaft 14 of the negative pressure booster 3 from the opening of the radial bore 79 by the reaction piston 35 in its inoperative condition to the complete closing of the radial bore 79 is chosen to be greater than the axial travel of the input shaft 24 from its inoperative position until the valve element 27 becomes seated upon the vacuum valve seat 26 of the negative pressure booster 3.

Operation

The operation of the embodiment constructed in the manner mentioned above will now be described. In the present embodiment, in the inoperative condition where the brake pedal 2 is not depressed, the components of the brake system 1 assume their inoperative positions shown in FIGS. 1 and 2, the pumps 71 are not driven, and the solenoid operated open/close valve 85 is closed. In the negative pressure booster 3, the vacuum valve 28 is open while the atmosphere valve 32 is closed, whereby both the constant pressure chamber A and the variable pressure chamber B assume a negative pressure. The master cylinder 4 has its intensifying chamber 56 connected in communication with the first liquid pressure chamber 62 and has its first and second liquid pressure chambers 62, 65 connected in communication with the reservoir 11. Accordingly, the first and the second liquid pressure chamber 62, 65 and the intensifying chamber 56 assume an atmospheric pressure.

If the brake pedal 2 is depressed under this inoperative condition, the input shaft 24 and the valve plunger 25 of the negative pressure booster 3 are driven forward, whereby the vacuum valve 28 is closed while the atmosphere valve 32 is opened. Accordingly, the atmosphere is introduced into the variable pressure chamber B, producing a pressure differential between the constant pressure chamber A and the variable pressure chamber B to drive the power piston 18, the valve body 17 and the output shaft 13 forward, thus actuating the negative pressure booster 3. Thus, the output shaft 13 causes the primary piston 33 associated with the master cylinder 4 to advance. As the radial bore 33b formed in the primary piston 33 crosses the cup seal 44, a master cylinder pressure is developed in the first liquid chamber 62. The master cylinder pressure developed in the first liquid pressure chamber 62 causes the secondary piston 36 also to advance, and as the radial bore 36a formed in the secondary piston 36 crosses the cup seal 58, a master cylinder pressure is developed in the second liquid pressure chamber 65.

The master cylinder pressures developed in the first and the second liquid pressure chamber 62 and 65 are supplied through the conduits 64 and 67 to the wheel cylinders 5, 6, 7 and 8.

The master cylinder pressure developed in the first liquid pressure chamber 62 acts upon the reaction piston 35 located within the primary piston 33 to drive it rearward. However, as long as the force with which the master cylinder pressure urges the reaction piston 35 is less than the resilience of the jumping spring 39, the reaction piston 35 remains immovable. As the master cylinder pressure in the first liquid pressure chamber 62 rises to produce a force urging the reaction piston 35 which is greater than the resilience of the jumping spring 39, the reaction piston 35 is urged rearward to abut against the intermediate rod 14. Thereupon, a reaction from the master cylinder pressure which is acting on the reaction piston 35 is transmitted through the intermediate rod 14, the buffering member 15, the valve plunger 25 and the input shaft 24 to the brake pedal 2 as a brake reaction. In this manner, the master cylinder pressure is controlled in accordance with the input applied to the brake pedal 2. In other words, the master cylinder pressure in the first liquid pressure chamber 62 is controlled so that the force produced by the master cylinder pressure in the first liquid pressure chamber 62 and acting upon the reaction piston 35 is balanced with the input acting upon the input shaft 24. A point where the reaction piston 35 abuts against the intermediate rod 14 corresponds to a jumping point, as commonly referred to, where a reaction begins to be transmitted to a driver and which is shown at J in FIG. 3. In the present embodiment, the jumping response can be easily modified by changing the resilience of the jumping spring 39.

As the primary piston 33 advances, the volume of the intensifying chamber 56 increases, but because the first liquid chamber 62 and the intensifying chamber 56 are maintained in communication through the radial bore 79 formed in the primary piston 33, the braking liquid from the first liquid chamber 62 is supplied to the intensifying chamber 56 through the radial bore 79 or the braking liquid from the reservoir 11 is supplied to the intensifying chamber 56 through the cup seal 81 for the check valve, and thus the liquid pressure in the intensifying chamber 56 eventually assumes the same liquid pressure as in the first liquid chamber 62. In this manner, the master cylinder pressure is developed in the first and the second liquid pressure chambers 62 and 65 of the master cylinder 4 in accordance with the input applied to the brake pedal 2, and is then supplied through the conduits 64 and 67 to the wheel cylinders 5, 6, 7 and 8, thus actuating the brakes.

As the input applied to the brake pedal 2 increases and the negative pressure booster 3 operates at a point close to the full load point and the pressure in the variable pressure chamber B assumes a given value, the controller mentioned above, not shown, responds to the input from the pressure sensor 87 and the input from the switch 86 which detects the operation of the brake pedal 2 by operating the pumps 71 and opening the solenoid operated open/close valve 85.

In this manner, the braking liquid in the first liquid chamber 62 of the master cylinder 4 begins to be supplied to the intensifying chamber 56 through the solenoid operated open/close valve 85 and the pump 71, but because the intensifying chamber 56 communicates with the first liquid chamber 62 through the radial bore 79 formed in the primary piston 33, the braking liquid which is supplied to the intensifying chamber 56 is merely returned to the first liquid chamber 62 without causing any change in the liquid pressure in the first liquid chamber 62 and the intensifying chamber 56. As the input further increases and the negative pressure booster 3 exceeds the full load point, the input shaft 24 and the valve plunger 25 begin to move forward and act through the buffering member 15 and the intermediate rod 14 to cause the reaction piston 35 to advance through the primary piston 33. As a consequence, the radial bore 79 formed in the primary piston 33 is throttled by the reaction piston 35, and thus the return flow of the discharge liquid from the pump 71 which is being supplied to the intensifying chamber 56 to the first liquid chamber 62 is also throttled, causing an increase in the liquid pressure in the intensifying chamber 56. The increased liquid pressure in the intensifying chamber 56 causes the primary piston 33 to be displaced forwardly, whereby the master cylinder pressure in the first liquid chamber 62 rises. In this manner, in the present embodiment, after the negative pressure booster 3 has exceeded the full load point or the limit of assistance, the gradient of the master cylinder pressure with respect to the input can be maintained as before the full load point is reached to allow the master cylinder pressure to rise, by supplying the liquid pressure from the pump 71 to the intensifying chamber 56, allowing the braking force to be boosted.

When the negative pressure which is supplied to the negative pressure booster 3 is reduced as a result of a failure of a source of pressure for the negative pressure booster 3, the negative pressure booster 3 would reach the full load point at a smaller input than in a normal operation, and thus can not provide a satisfying boosting operation. However, the pressure in the variable pressure chamber B of the negative pressure booster 3 can assume a given value with a smaller input than in a normal operation, and thus the intensifying means 12 operates in the same manner as mentioned above to increase the master cylinder pressure in the master cylinder 4, allowing the braking force to be boosted. In this manner, in the present embodiment, the master cylinder pressure is developed by a sum of the force with which the negative pressure booster 3 urges the primary piston 33 associated with the master cylinder 4 and the force with which the intensifying means 12 urges the primary piston 33, and thus the master cylinder pressure is controlled in accordance with the input applied to the brake pedal 2. This allows the braking force to be boosted even subsequent to the full load point of or the limit of assistance by the negative pressure booster 3, and enables the assistance to be provided if the negative pressure supplied is reduced as a result of a depression in the pressure of a source of negative pressure for the negative pressure booster 3.

Second Embodiment

Figure 4:
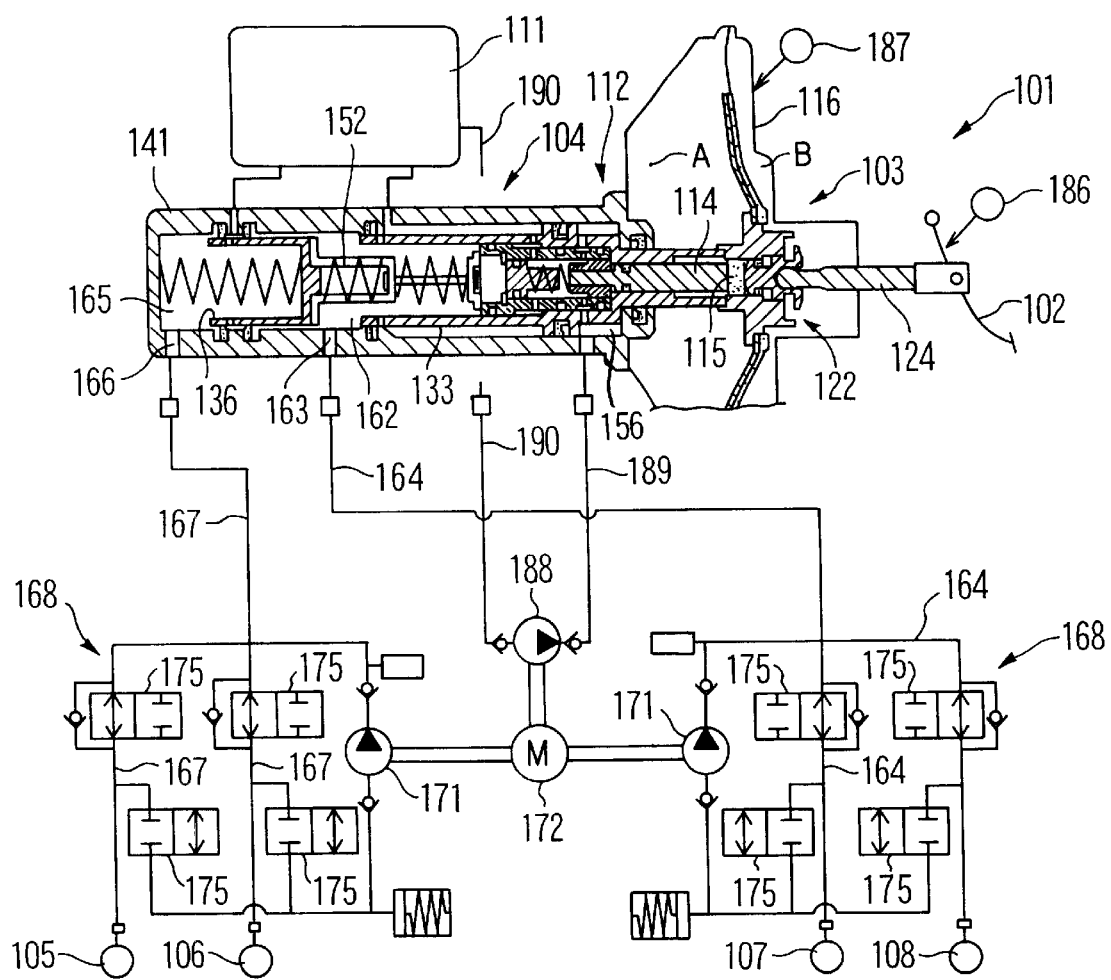
FIG. 4 is an overall schematic view of a second embodiment of the invention.
Figure 5:
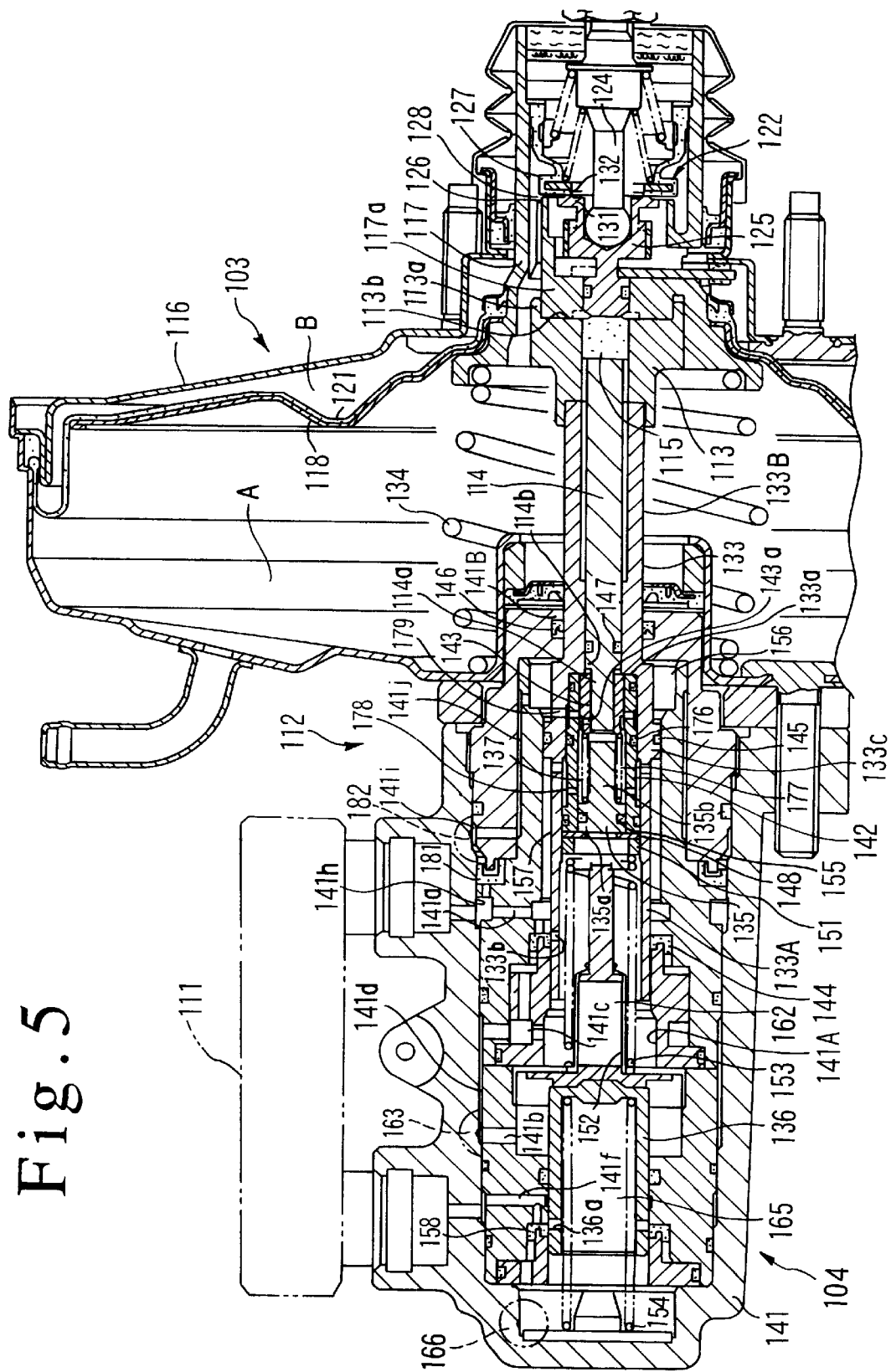
FIG. 5 is an enlarged cross section of an essential part shown in FIG. 4.

FIGS. 4 and 5 show a second embodiment of the invention, which is different from the first embodiment mentioned above in respect of the internal construction of a primary piston 133 and a pump arrangement. Parts corresponding to those shown in the first embodiment are designated by like numerals as used before, to which 100 is added, without repeating a detailed description.

In the second embodiment, the arrangement of a negative pressure booster 103 remains entirely identical with the first embodiment, but the primary piston 133 associated with a master cylinder 104 has a different internal construction.

Referring to FIG. 5, the primary piston 133 is internally formed with a stepped through-opening, and has a larger diameter portion 133A toward the axial front end and a smaller diameter portion 133B toward the axial rear end. An annular projection 133C of a greater diameter than that of the larger diameter portion 133A is formed at a given location around the outer periphery of the larger diameter portion 133A. A front portion of an intermediate rod 114 is slidably fitted into the smaller diameter portion 133B of the primary piston 133, with a seal member 147 being fitted around the outer periphery of the rod 114 to maintain the liquid tightness between the inner peripheral surface of the smaller diameter portion 133B and the outer peripheral surface of the intermediate rod 114.

A sleeve 142 is inserted, from the front side, into the stepped through-opening in the larger diameter portion 133A of the primary piston 133 until the rear end face of the sleeve 142 abuts against a stepped end face 133a of the through-opening. An annular retainer 148 is disposed in abutment against the front end face of the sleeve 142, and an annular member 151 is fitted into the through-opening to abut against the retainer 148 so as to secure the sleeve 142 and the retainer 148 integrally to the primary piston 133.

A spool 143 is sidably inserted into the inner periphery of the sleeve 142 toward its rear end, and a reaction piston 135 is slidably inserted into the inner periphery of the sleeve 142 toward its front end at a location forward of the spool 143. A jumping spring 137 is disposed between the reaction piston 135 and the spool 143, and in the inoperative condition, the front end face of the reaction piston 135 abuts against the rear side of the retainer 148 while the rear end face of the spool 143 abuts against the stepped end face 133a in the stepped through-opening of the primary piston 133. The spool 143 is formed with a through-opening, into which a front smaller diameter portion 114a of the intermediate rod 114 is inserted, with the free end of the smaller diameter portion 114a facing the rear end face of the reaction piston 135. In the inoperative condition, a clearance is maintained between the rear end face of the spool 143 and a step 114b in the intermediate rod 114.

An internal space between the outer peripheral surface of the larger diameter portion 113a of the primary piston 133 which is located rearward of the annular projection 133C and the inner peripheral surface of the larger diameter bore 141A in the housing 141 defines an intensifying chamber 156, which communicates through an axial path 141j and a radial path 141i formed in the housing 141 with a communication opening 182, which is in turn connected to the discharge side of a pump 188 to be described later. The intensifying chamber 156 communicates with an internal chamber 177 within the sleeve 142 through a radial bore 179 which extends through the primary piston 133 and the sleeve 142. In the inoperative condition, the radial bore 179 provides a communication between the intensifying chamber 156 and the internal chamber 177, but upon actuation, as the spool 143 is operated by the intermediate rod 114 to move forward, the spool 143 blocks the inner opening of the radial bore 179 to throttle a flow of the braking liquid from the intensifying chamber 156 to the internal chamber 177. In other words, the combination of the spool 143, the sleeve 142 and the radial bore 179 constitutes together a control valve for the intensifying means 112.

The internal chamber 177 within the sleeve 142 communicates with an annular liquid chamber 157 defined between the outer peripheral surface of the larger diameter portion 133A of the primary piston 133 and the inner peripheral surface of the larger diameter bore 141A of the housing 141 in a region between a cup seal 144 on the housing 141 and a seal member 145 on the annular projection 133C of the primary piston 133 through a radial bore 178 Which extends through the sleeve 142 and the primary piston 133, and thence communicates with a reservoir 111 through a radial bore 141a formed in the housing 141. Accordingly, in the inoperative condition, the intensifying chamber 156 communicates with the reservoir through the radial bore 179, the internal chamber 177, the radial bore 178, the annular liquid chamber 157 and the radial bore 141a.

The second embodiment differs from the first embodiment in the arrangement of pumps which supply a braking liquid to the intensifying chamber 156, as shown in FIG. 4. In the first embodiment, such pump has been also used as an antiskid control pump 71, but in the second embodiment, a pump 188 for supplying a braking liquid to the intensifying chamber 156 is provided separately from an antiskid control pump 171 even though the pump 188 is driven by the same motor 172 which also drives the antiskid control pump 171. The discharge side of the pump 188 is connected to the intensifying chamber 156 through a check valve which allows a flow of braking liquid only in a direction from the pump 188 to the intensifying chamber 156 and through a conduit 189 while the suction side of the pump 188 is connected to the reservoir 111 through a check valve which allows a flow of braking liquid only in a direction from the reservoir 111 to the pump 188 and through a conduit 190.

In other respects, the arrangement remains the same as in the first embodiment.

Operation of Second Embodiment

The operation of the second embodiment will now be described. When a brake pedal 102 is depressed under the inoperative condition shown in FIGS. 4 and 5 to actuate the negative booster chamber 103, an output shaft 113 of the negative booster chamber 103 moves forward to cause the primary piston 133 associated with a master cylinder 104 to advance, thus developing a master cylinder pressure in a first liquid chamber 162. This causes a secondary piston 136 to move forward, whereby a master cylinder pressure is developed in a second liquid pressure chamber 165. These master cylinder pressures are supplied through conduits 164 and 167 to wheel cylinders 105, 106, 107 and 108. At this time, as the primary piston 133 advances, the volume of the intensifying chamber 156 increases, but because the radial bore 179 through the sleeve 142 is open, the braking liquid from the reservoir 111 is supplied to the intensifying chamber 156 through the radial bore 179 or through the cup seal 181 for the check valve, whereby the intensifying chamber remains at the atmospheric pressure.

At the commencement of the operation, an input shaft 124 and a valve plunger 125 move forward to cause an intermediate rod 114 to move forward also, but the step 114b on the intermediate rod 114 does not abut against the spool 143, and the free end of the smaller diameter portion 114a does not abut against the reaction piston 135. Under this condition, as the master cylinder pressure in the first liquid pressure chamber 162 rises, the master cylinder pressure acts on the reaction piston 135, and as the force with which the master cylinder pressure urges the reaction piston 135 exceeds the resilience of a spring 137, the reaction piston 135 retracts to abut against the free end of the smaller diameter portion 114a of the intermediate rod 114. Thus, a reaction from the master cylinder pressure acting on the reaction piston 135 is transmitted as a brake reaction to the brake pedal 102 through the intermediate rod 114, a buffering member 115, the valve plunger 125 and the input shaft 124. In this manner, the master cylinder pressure in the first liquid pressure chamber is controlled in accordance with the input in the similar manner as in the first embodiment. The point where the reaction begins to be transmitted represents a so-called jumping point, and the jumping response can be easily modified by changing the resilience of the spring 137.

As the input to the brake pedal 102 increases and the negative pressure booster 103 approaches the full load point, a controller, not shown causes the pump 188 to be driven in response to inputs from a pressure sensor 187 which detect the pressure in the variable pressure chamber B and from a switch 186 which detects an operation of the brake pedal 102. Under this condition, the braking liquid from the pump 188 which is supplied to the intensifying chamber 156 is returned to the reservoir 111 through the radial bore 179, the internal chamber 177, a radial bore 178, an annular liquid chamber 157 and a radial bore 141a without developing a liquid pressure in the intensifying chamber 156 because the radial bore 179 in the sleeve 142 is sufficiently open.

As the input further increases and the negative pressure booster 103 reaches the full load point, the forward movement of the input shaft 124 and the valve plunger 125 causes the intermediate rod 114 to move forward, whereby the step 114b abuts against the spool 143 to cause it to advance, thus throttling the radial bore 179.

In this manner, a liquid pressure is developed in the intensifying chamber 156 and urges the primary piston 133, thus allowing the braking force to be boosted even after the full load point or the limit of assistance, in the similar manner as in the first embodiment. If the negative pressure supplied is reduced as a result of failure of a source of negative pressure for the negative pressure booster 103, the braking force can be boosted in the same manner as during a normal operation.

As mentioned previously, in the first embodiment, the intensifying means 12 is effective to supply the braking liquid in the first liquid chamber 62 of the master cylinder 4 to the intensifying chamber 56 within the master cylinder 4 through the solenoid operated open/close valve 85 and the pump 71, and the radial bore 79 through the primary piston 33 which returns the braking liquid supplied to the intensifying chamber 56 to the first liquid pressure chamber 62 is throttled to develop a liquid pressure in the intensifying chamber 56 which is higher than in the first liquid pressure chamber 62, and such liquid pressure urges the primary piston 33 to intensify the master cylinder pressure. By contrast, in the second embodiment, the braking liquid in the reservoir 111 is supplied through the pump 188 to the intensifying chamber 156 within the master cylinder 104, and the radial bore 179 which returns the braking liquid supplied to the intensifying chamber 156 to the reservoir 111 is throttled to develop a liquid pressure in the intensifying chamber 156, and the liquid pressure urges the primary piston 133 to intensify the master cylinder pressure. In the second embodiment, the pump 188 which supplies the braking liquid to the intensifying chamber 156 is provided separately from the antiskid control pump 171, allowing the intensifying means 112 to be operated without being influenced by the antiskid control. In other respects, the advantages remain similar to the first embodiment.

Third Embodiment

In the first and the second embodiment, the pumps 71, 181 are driven as the negative pressure boosters 3, 103 approach the full load point in order to operate the intensifying means 12, 112 subsequent to the full load point of the negative pressure boosters 3, 103. However, in the third and the fourth embodiment, an arrangement can be made such that as switches 86, 186 detect the depression of brake pedals 2, 102, a controller causes pumps 71, 188 of the intensifying means 12, 112 to be driven to initiate the intensifying operation by the intensifying means 12, 112.

The third embodiment is constructed in this manner, and as a switch 86 detects the depression of the brake pedal 2, the controller causes the pump 71 to be driven and opens the solenoid operated open/close valve 85.

Accordingly, during a quick braking operation where the brake pedal 2 is rapidly depressed, the introduction of the atmosphere into the variable pressure chamber B may be retarded in the negative pressure booster 3 to delay a rise in the master cylinder pressure. However, in the third embodiment, the intensifying means 12 initiates its operation at the same time as the brake pedal 2 is depressed, thus allowing the master cylinder pressure to rise rapidly to improve the response during a quick braking operation when the brake pedal 2 is rapidly depressed.

Fourth Embodiment

The fourth embodiment is constructed to provide the above described operation with respect to the second embodiment. As the switch 186 detects the depression of the brake pedal 102, the pump 188 of the intensifying means 112 is operated, achieving a similar effect as achieved by the third embodiment.

Fifth Embodiment

Figure 6:
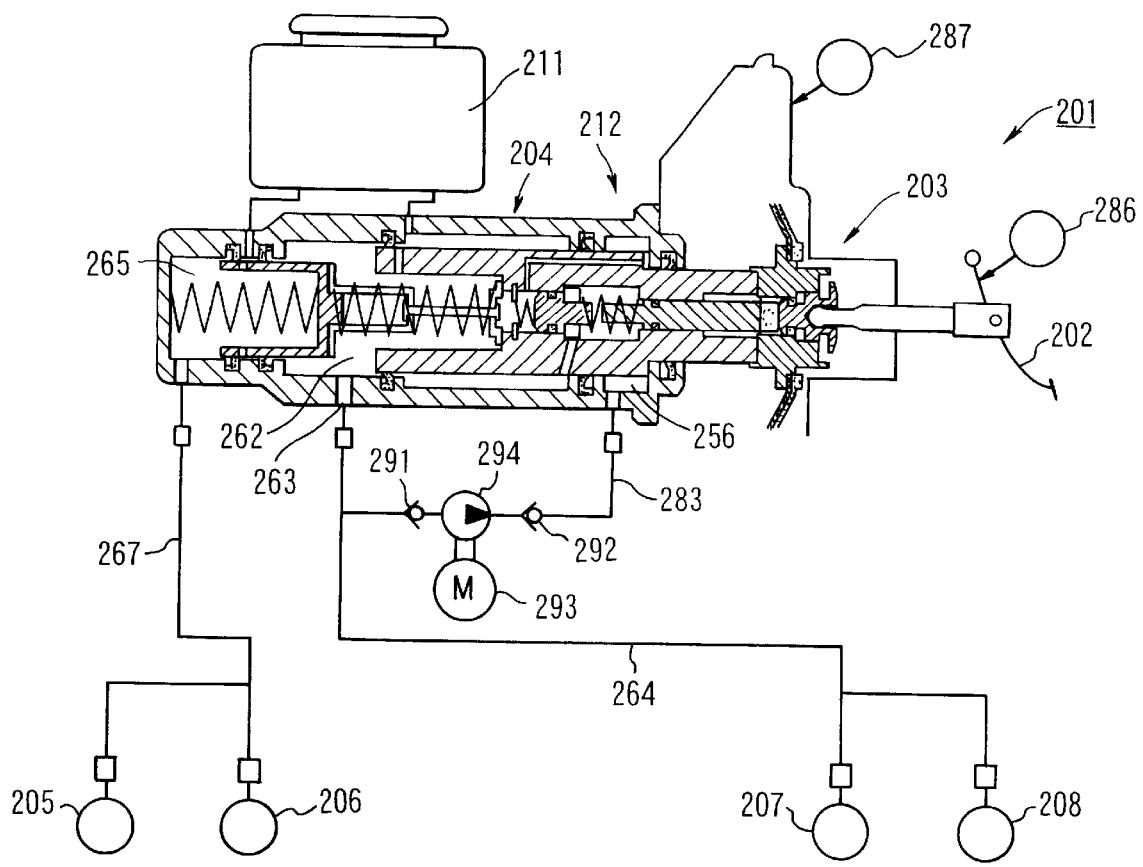
FIG. 6 is an overall schematic view of a fifth embodiment of the invention.

FIG. 6 shows a fifth embodiment of the invention, which differs from the first embodiment only in the arrangement of a pump which supplies a braking liquid to an intensifying chamber 256 within a master cylinder 204. Accordingly, parts corresponding to those shown in the first embodiment are designated by like numerals as used before, to which 200 is added, without repeating a detailed description.

Specifically, in the brake system 1 of the first embodiment, there is provided liquid pressure control means 68 which is known in the art to provide an antiskid control, and the pump which supplies a braking liquid to the intensifying chamber 56 within the master cylinder 4 also serves as the antiskid control pump 71. A portion of the conduit 64 which connects between the suction side of the pump 61, the first liquid pressure chamber 62 of the master cylinder 4 and the wheel cylinders 7 and 8 which is located nearer the master cylinder than the liquid pressure control means 68 is connected to the solenoid operated open/close valve 85. By contrast, no liquid pressure control means which provides an antiskid control is provided in a brake system 201 of the fifth embodiment. Instead, a conduit 283 connects between a conduit 264 which connects between a first liquid pressure chamber 262 within a master cylinder 204 and wheel cylinders 207 and 208 and an intensifying chamber 256 within the master cylinder 204. Check valves 291 and 292 which allow a flow of braking liquid only in a direction from the conduit 264 to the intensifying chamber 256 and a pump 294 which is driven by a motor 293 are disposed in the conduit 283. In other respects, the arrangement of the fifth embodiment remains similar to the first embodiment, and the fifth embodiment operate in substantially the same manner as the first embodiment.

The fifth embodiment is applicable to a brake system which is not provided with a liquid pressure control means such as for antiskid control. In other respects, the advantages remains similar to those of the first embodiment.

Sixth Embodiment

Figure 7:
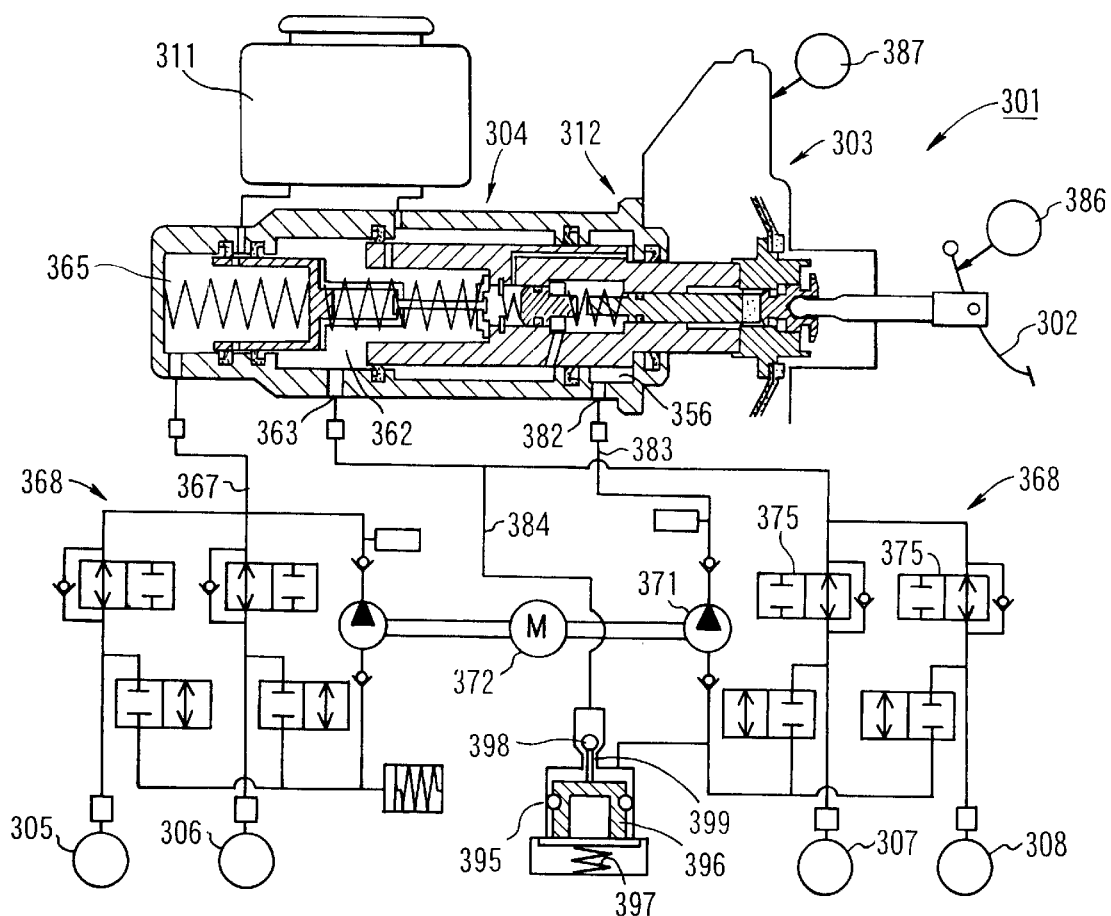
FIG. 7 is an overall schematic view of a sixth embodiment of the invention.

FIG. 7 shows a sixth embodiment of the invention, which differs from the first embodiment only in the arrangement of the suction side of a pump 371 which supplies a braking liquid to an intensifying chamber 356 within a master cylinder 304. Accordingly, similar parts to those shown in the first embodiment are designated by like numerals as used before, to which 300 is added, without repeating a detailed description thereof.

In the brake system 1 of the first embodiment, a pump which supplies a braking liquid to the intensifying chamber 56 within the master cylinder 4 also serves as the antiskid control pump 71, and a portion of the conduit 64 which connects between the suction side of the pump 71, the first liquid pressure 62 of the master cylinder 4 and the wheel cylinders 7, 8 which is located nearer the master cylinder than the liquid pressure control means 68 is connected to the conduit 84 in which the solenoid operated open/closed valve 85 is disposed. By contrast, in the brake system 301 of the sixth embodiment, the solenoid operated open/closed valve 85 is eliminated, and a liquid pressure control means 368 has a sump unit 395 with a mechanically switched valve. At a point close to a pump 371, a conduit 384 is connected to the switched valve of the sump unit 395.

The sump unit 395 with a mechanically switched valve comprises a piston 396, a spring 397 which urges the piston 396, a switching valve 398 functioning as a check valve which allows a flow of braking liquid only in a direction from the sump unit 395 to the conduit 384, and an urging member 399 mounted on the piston 396 to open or close the switching valve 398. When no braking liquid is accumulated in the sump unit 395, the piston 396 moves upward, as viewed in FIG. 7, under the influence of the spring 397, whereby the urging member 399 opens the valve 398. When the braking liquid is accumulated in the sump unit 395, the piston 396 moves downward against the resilience of the spring 397 to close the valve 398. In other respects, the arrangement is similar to the first embodiment.

In the sixth embodiment, when a brake pedal 302 is depressed to develop a master cylinder pressure in a first liquid pressure chamber 362 of a master cylinder 304, the braking liquid in the first liquid pressure chamber 362 is supplied to the sump unit 395 through a conduit 384 and the open valve 398. When a given amount of braking liquid is accumulated, the piston 396 moves down against the resilience of the spring 397 to close the valve 398. As the brake pedal 302 is released, and the master cylinder pressure becomes null, the braking liquid accumulated in the sump unit 395 opens the valve 398 which functions as a check valve to be returned into the master cylinder 304. Because the sump unit 395 accumulates the braking liquid each time the brake is actuated, the braking liquid accumulated in the sump unit 395 is immediately supplied to a intensifying chamber 356 whenever a pump 371 of intensifying means 312 is operated. The sixth embodiment provides the same advantages as those provided by the first embodiment.

Other Embodiments

FIGS. 8 to 11 show other embodiments of the invention. In the described embodiments, the primary piston 33 (133, 233 or 333) of the master cylinder 4 (104, 204 or 304) has been fitted over the output shaft 13 (113 or 213) of the negative pressure booster 3 (103, 203 or 303). However in the embodiments shown in FIGS. 8 to 11, a spacer 419 (519, 619 or 719) is interposed between an output shaft of a negative pressure booster and a primary piston to serve as dimension adjusting means while the buffering member 15 is eliminated to dispose an intermediate rod 414 (514, 614 or 714) in abutment against a valve plunger 425 (525, 625 or 725). In addition, control valves disposed within a primary piston 433 (533, 633 or 733) are suitably modified in the embodiments shown in FIGS. 8 to 11.

Seventh Embodiment

Figure 8:
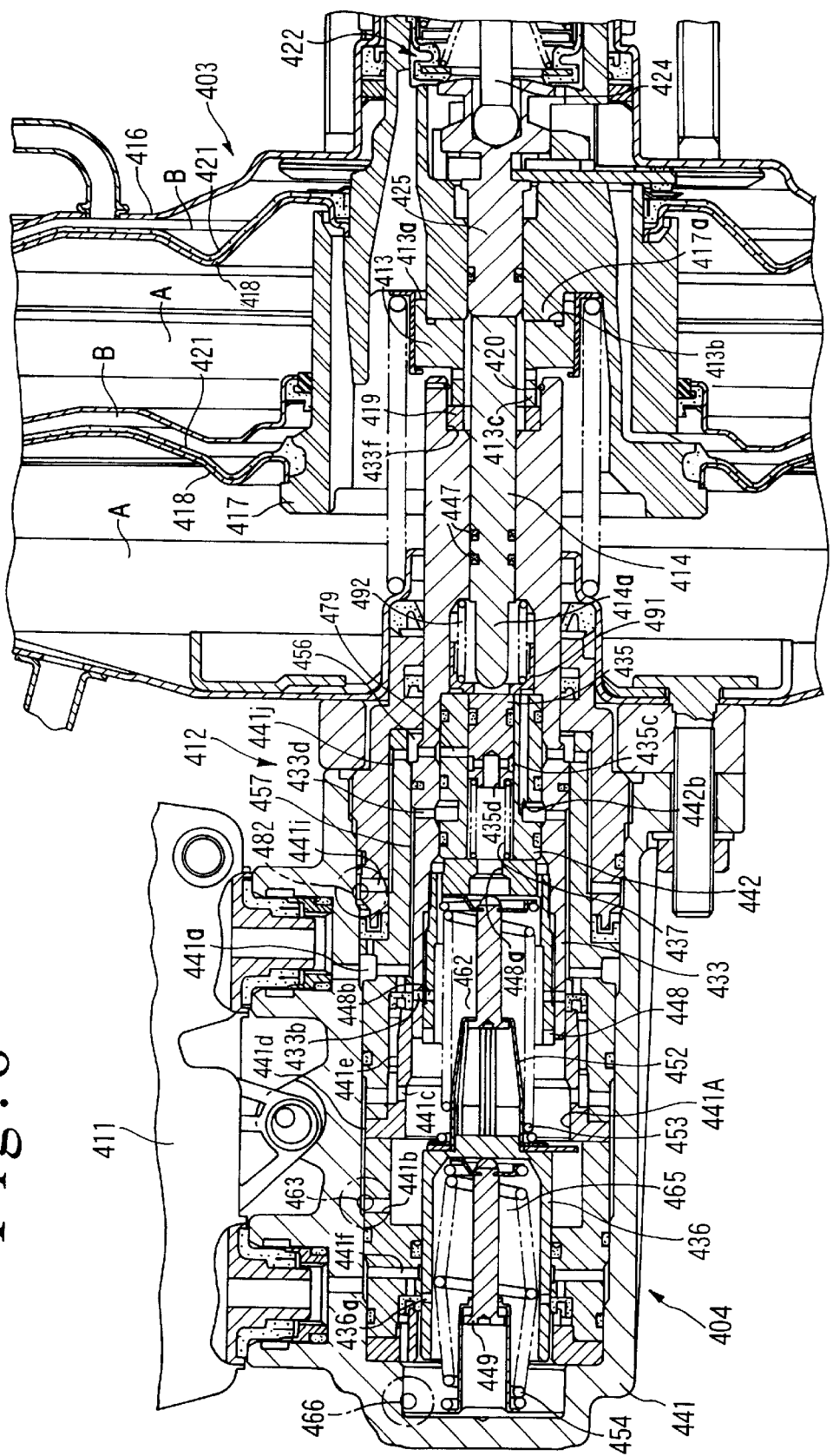
FIG. 8 is a cross section of a seventh embodiment of the invention.

A seventh embodiment is shown in FIG. 8. This embodiment is an improvement of part of the first embodiment shown in FIG. 2.

Specifically, a ring-shaped spacer 419 is fitted from the rear side into a rear larger diameter bore 433*f* of a primary piston 433 and is disposed in abutment against a stepped end face of the larger diameter bore 433*f*. A front tubular portion 413*c* of an output shaft 413 is inserted into the larger diameter bore 433*f* from the rear side of the spacer 419 and its front end is disposed in abutment against the spacer 419. A stop ring 420 is mounted on the rear side of the larger diameter bore 433*f* to prevent the spacer 419 from being withdrawn from the larger diameter bore 433*f*.

In this manner, the primary piston 433 and the output shaft 413 are coupled together through the interposed spacer 419 in the seventh embodiment. In the present embodiment, a plurality of spacers 419 having different axial dimensions or thicknesses are prepared, and one of a suitable dimension is selected therefrom to be fitted into the larger diameter bore 433*f*, thus allowing the axial stop position of the primary piston 433 in the inoperative condition to be adjusted.

Alternatively, the spacer 419 may be omitted, and instead the tubular portion 413*c* of the output shaft 413 or the larger diameter bore 433*f* of the primary piston 433 may be formed with threads, which may be threadably engaged by a cylindrical adjusting member.

In this embodiment, an intermediate rod 414 and a valve plunger 425 are disposed in direct abutment against each other, and a pair of seal members 447 are mounted around the outer periphery of the intermediate rod 414. By providing the pair of seal members 447, the liquid tightness between the outer periphery of the intermediate rod 414 and the inner periphery of the primary piston 433 can be maintained in a reliable manner.

In the present embodiment, a plurality of intermediate rods 414 having different axial sizes are prepared, and one having a suitable dimension is chosen therefrom. This allows a clearance between the intermediate rod 414 and the reaction piston 435 in the inoperative condition to be adjusted, thereby allowing a lost stroke which occurs before a reaction piston 435 throttles a radial bore 479 to be adjusted.

Means for adjusting a clearance between the intermediate rod 414 and the reaction piston 435 in the inoperative condition may be chosen as follows; specifically, a plurality of disc-shaped regulating members having different thicknesses are prepared, and one having a suitable thickness is chosen therefrom to be interposed between the rear end of the intermediate rod 414 and the valve plunger 425. Alternatively, a smaller diameter portion 414*a* of the intermediate rod 414 may be formed with threads, which may be threadably engaged by a regulating member in the form of a cap nut.

In the seventh embodiment, the ring-shaped retainer 48 shown in FIG. 2 is replaced by a securing member 448 in the form of a stepped cylinder to secure a sleeve 442 to the inner periphery of the primary piston 433. Specifically, the inner periphery of the primary piston 433 is formed with stepped female threads at a point forward of the location where the sleeve 442 is fitted. On the other hand, the outer periphery of the securing member 448 is formed with male threads, which may be threadably engaged with the female threads in the inner periphery of the primary piston 433, with the rear end face of the securing member 448 disposed in abutment against the sleeve 442. In this manner, the sleeve 442 is secured to the inside of the primary piston 433 by using the securing member 448.

A return spring 453 and a retainer 452 are disposed between the securing member 448 and a secondary piston 436. The end face of the securing member 448 is formed with an axial bore 448*a* to provide a communication thereacross. A radial bore 448*b* is formed in the front portion of the securing member 448 in alignment with a radial bore 433*b* through the primary piston 433.

In the present embodiment, a retainer 449, which is constructed in the same manner as the retainer 452, is disposed inside a return spring 454 associated with the secondary piston 436.

In the present embodiment, the outer periphery of the reaction piston 435 is formed with an annular groove 435*c* adjacent to the front end thereof, and a communication path 435*d*, which is T-shaped in section, is formed inside the reaction piston 435 continuing from the annular groove 435*c*. In this manner, the degree of overlap in the axial direction between the annular groove 435*c* and a radial path 479 through the primary piston 433 is variable. Thus, the radial path 479 and the reaction piston 435 constitute together a control valve.

In the embodiment shown in FIG. 2, the negative pressure booster 3 comprises a single constant pressure chamber A and a single variable pressure chamber B. However, the seventh embodiment shown in FIG. 8 uses a negative pressure booster 403 of tandem type including two pairs of constant pressure chambers A and variable pressure chambers B.

In the present embodiment, a difference between a pressure responsive area of the primary piston 433 which faces the first liquid pressure chamber 462 and which is subject to the liquid pressure in the first liquid chamber 462 and a pressure responsive area of the primary piston which faces an intensifying chamber 456 is chosen to be equal to a pressure responsive area of the secondary piston 436. In other respects, the arrangement is similar to the first embodiment shown in FIGS. 1 and 2 and corresponding parts are designated by like reference numerals as used before, to which 400 is added, without repeating a detailed description.

The reason for choosing the pressure responsive area of the primary piston 433 in the manner mentioned above in the present embodiment will be described below. In the embodiments shown in FIG. 2, FIG. 8 and FIG. 9 (which will be described later), an arrangement is used which provides a communication between the first liquid chamber 462 and the intensifying chamber 456. Accordingly, as the primary piston 433 strokes upon actuation, the braking liquid in the first liquid pressure chamber 462 is supplied to the wheel cylinders (7, 8) and is also supplied to the intensifying chamber 456. Consequently, in order to supply the same amount of braking liquid to the wheel cylinders (7, 8), the primary piston 433 must be stroked through an additional amount which corresponds to the amount of the braking liquid which is supplied to the intensifying chamber 456, thus requiring an increased pedal stroke, which changes the pedal stroke response.

For this reason, the pressure responsive area of the primary piston 433 is chosen in the manner mentioned above to maintain the pedal stroke response as before.

More specifically, in the prior art practice, the primary piston and the secondary piston have equal pressure responsive areas in order to maintain the same liquid pressure in the first and the second liquid pressure chamber. By contrast, in the embodiments shown in FIGS. 8 and 9, a difference between the pressure responsive area of the primary piston 433 (or 533) which faces the first liquid pressure chamber 462 (or 562) and the pressure responsive area which faces the intensifying chamber 456 (or 556) is chosen to be equal to the pressure responsive area of the secondary piston 436 (or 536). Hence, a similar pedal stroke as in the prior art can be used to supply the same amount of braking liquid as before to the wheel cylinders (7, 8), thus maintaining the same pedal stroke response as in the prior art.

Since the force resulting from the liquid pressure in the first liquid pressure chamber 462 and acting upon the difference between the pressure responsive area facing the first liquid pressure chamber 462 and the pressure responsive area facing the intensifying chamber pressure 456 is balanced with the output from the negative pressure booster 403 for the primary piston 433, the liquid pressure in the first liquid pressure chamber 462 remains unchanged from the prior art as considered with respect to the force with which the pedal is depressed, and accordingly the master cylinder liquid pressure response with respect to the force of depressing the pedal can be maintained to be the same as in the prior art.

In the embodiment shown in FIG. 5 and embodiments shown in FIGS. 10 and 11 which will be described later, an arrangement is made such that the first liquid pressure chamber 162 (or 662 and 762) does not communicate with the intensifying chamber 156 or (656 and 756). Accordingly, in the embodiments shown in FIGS. 5, 10 and 11, there is no need for the choice that a difference between the pressure responsive area of the primary piston 133 (or 633 and 733) which faces the first liquid pressure chamber and the pressure responsive area which faces the intensifying chamber be equal to the pressure responsive area of the secondary piston 136 (or 636 and 736).

It should be understood that the seventh embodiment shown in FIG. 8 achieves the function and advantages mentioned above as well as similar function and effects as described previously in connection with the embodiment shown in FIG. 2.

Eighth Embodiment

Figure 9:
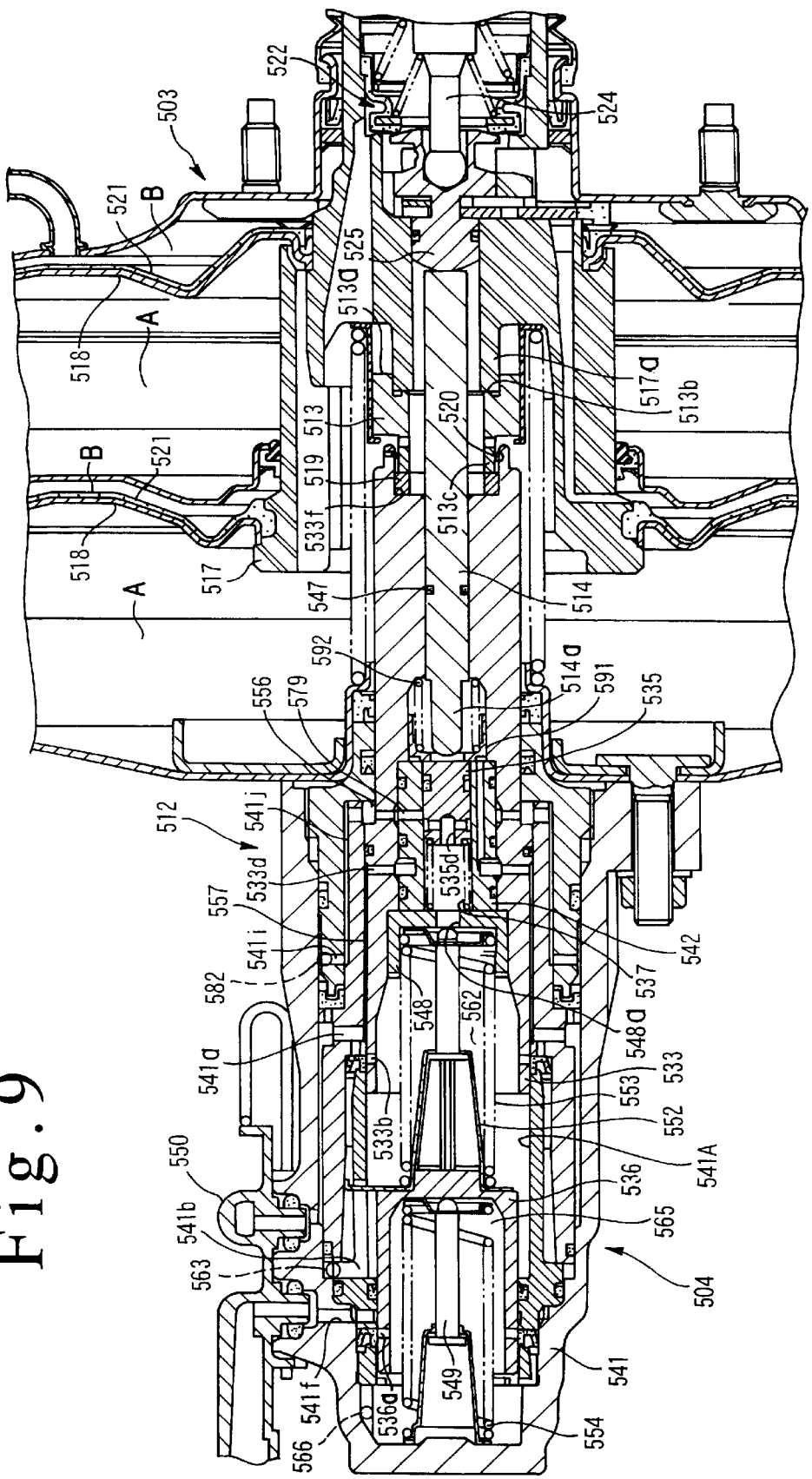
FIG. 9 is a cross section of an eighth embodiment of the invention.

FIG. 9 shows an eighth embodiment, which represents an improvement of the securing member 448 of the seventh embodiment shown in FIG. 8.

Specifically, the eighth embodiment employs a cup-shaped securing member 548, which is disposed as a press fit into the inner periphery of a primary piston 533 and the end face of the securing member 548 is disposed in abutment against a sleeve 542, thus securing the sleeve 542 within the primary piston 533. The end face of the securing member 548 is formed with an axial through-opening 548a, providing a communication across the end face.

A single seal member 547 is mounted around the outer periphery of an intermediate rod 514 in the eighth embodiment.

In addition, in the eighth embodiment, a reservoir, not shown, is disposed forwardly as spaced from a master cylinder 504, and in order to provide a communication between radial bores 514a, 514f formed through the master cylinder 504 and the reservoir, connection means 550 which is known in the art is employed. In other respects, the arrangement is similar to that of the seventh. embodiment shown in FIG. 8, and accordingly, corresponding parts are designated by like reference numerals as used before, to which 100 is added, without repeating a detailed description.

The eighth embodiment constructed in the manner mentioned above achieves the similar functioning and advantages as described above in connection with the seventh embodiment.

Ninth Embodiment

Figure 10:
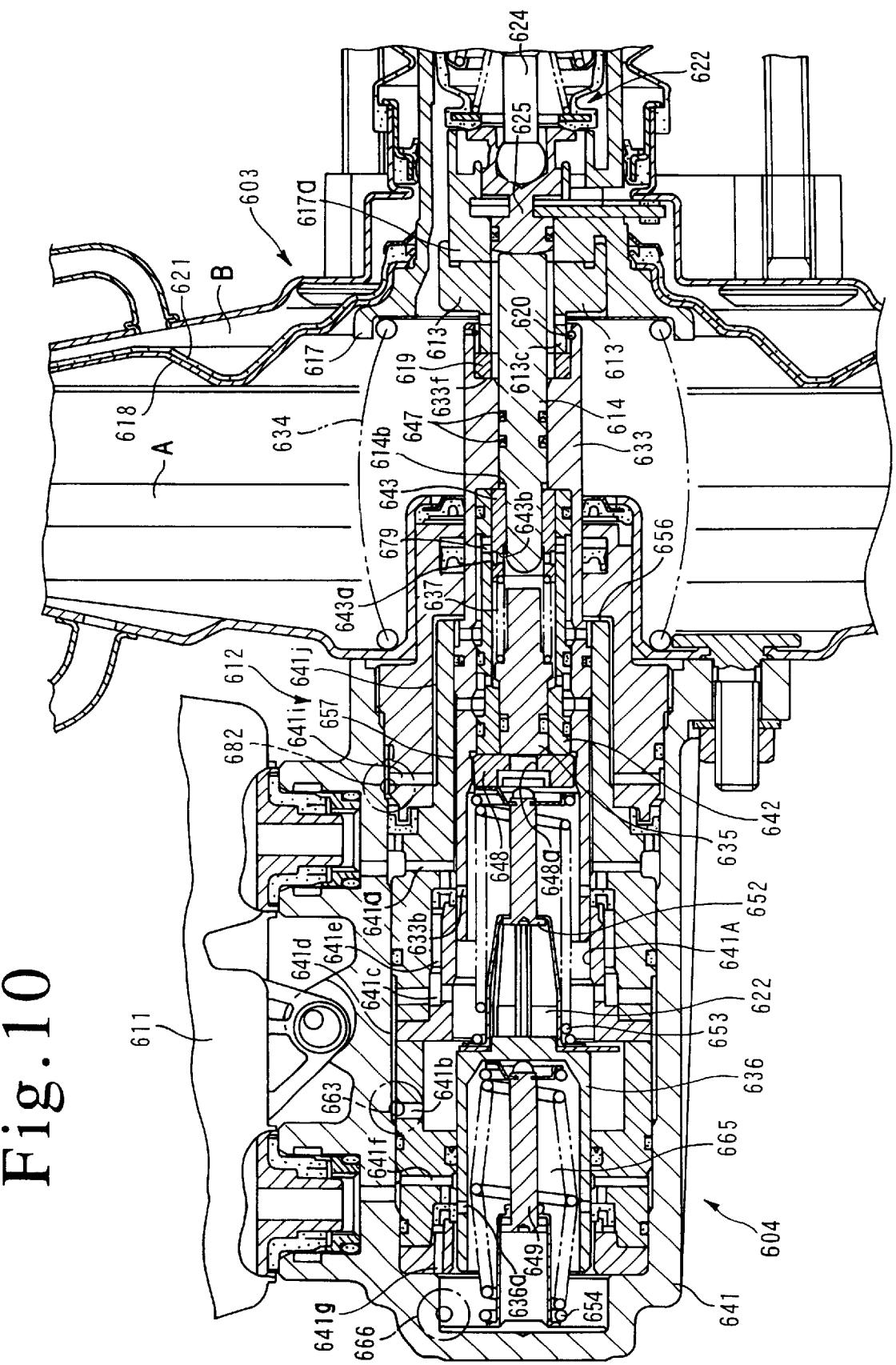
FIG. 10 is a cross section of a ninth embodiment of the invention.

FIG. 10 shows a ninth embodiment of the invention, which represents an improvement of the embodiment shown in FIG. 5.

Specifically, in the ninth embodiment, a ring-shaped spacer 619 is interposed between a primary piston 633 and a tubular portion 613c of an output shaft 613, in the similar manner as in the embodiment shown in FIG. 8. This permits an axial position where the primary piston 633 stops in the inoperative condition to be adjusted.

An intermediate rod 614 has a pair of seal members 647 mounted around the outer periphery thereof, whereby the liquid tightness between the outer periphery of the intermediate rod 614 and the inner periphery of the primary piston 633 can be maintained in a reliable manner. In addition, the buffering member 15 shown in FIG. 5 is omitted in this embodiment, and the intermediate rod 614 is disposed in direct abutment against a valve plunger 625.

In the ninth embodiment also, a plurality of intermediate rods 614 having different lengths are prepared, and one having a suitable length is chosen to be fitted into the inner periphery of the primary piston 633, thereby allowing a clearance between a step 614b of the intermediate rod 614 and a spool 643 in the inoperative condition to be adjusted and thus allowing a lost stroke until the spool 643 throttles the inner opening of a radial bore 679 to be adjusted.

In the present embodiment, the spool 643 has a uniform external diameter over the entire axial region thereof while the outer periphery of the spool 643 is formed toward its front end with an annular groove 643a and a continuing radial bore 643b. As the spool 643 moves in the axial direction, the degree of axial overlap between the annular groove 643a and the radial bore 679 can be adjusted to adjust a throttling of the radial bore 679.

In the present embodiment, the retainer 148 and the annular member 151 shown in FIG. 5 are replaced by a single securing member 648 to secure a sleeve 642 within the primary piston 633. More specifically, the outer periphery of the annular securing member 648 is formed with threads while the inner periphery of the primary piston 633 is formed with female threads. The securing member 648 is threadably engaged with the inner periphery of the primary piston 633, and the end face of the securing member 648 is disposed in abutment against the sleeve 642, thus securing the sleeve 642 in the inner periphery of the primary piston 633. The front end face of a reaction piston 635 is supported by the end face of the securing member 648. It will be noted that the rear end of a return spring 653 abuts against the securing member 648.

Also in the present embodiment, a retainer 649 which is known in the art is disposed inside a return spring 654 associated with a second liquid pressure chamber 665. In other respects, the arrangement is similar to the embodiment shown in FIG. 5, and accordingly, corresponding parts are designated by like reference numerals as used before, to which 500 is added, without repeating a detailed description.

The ninth embodiment constructed in the manner mentioned above achieves the similar functioning and advantages as achieved by the embodiment shown in FIG. 5, in addition to the functioning and advantages mentioned above.

Tenth Embodiment

Figure 11:
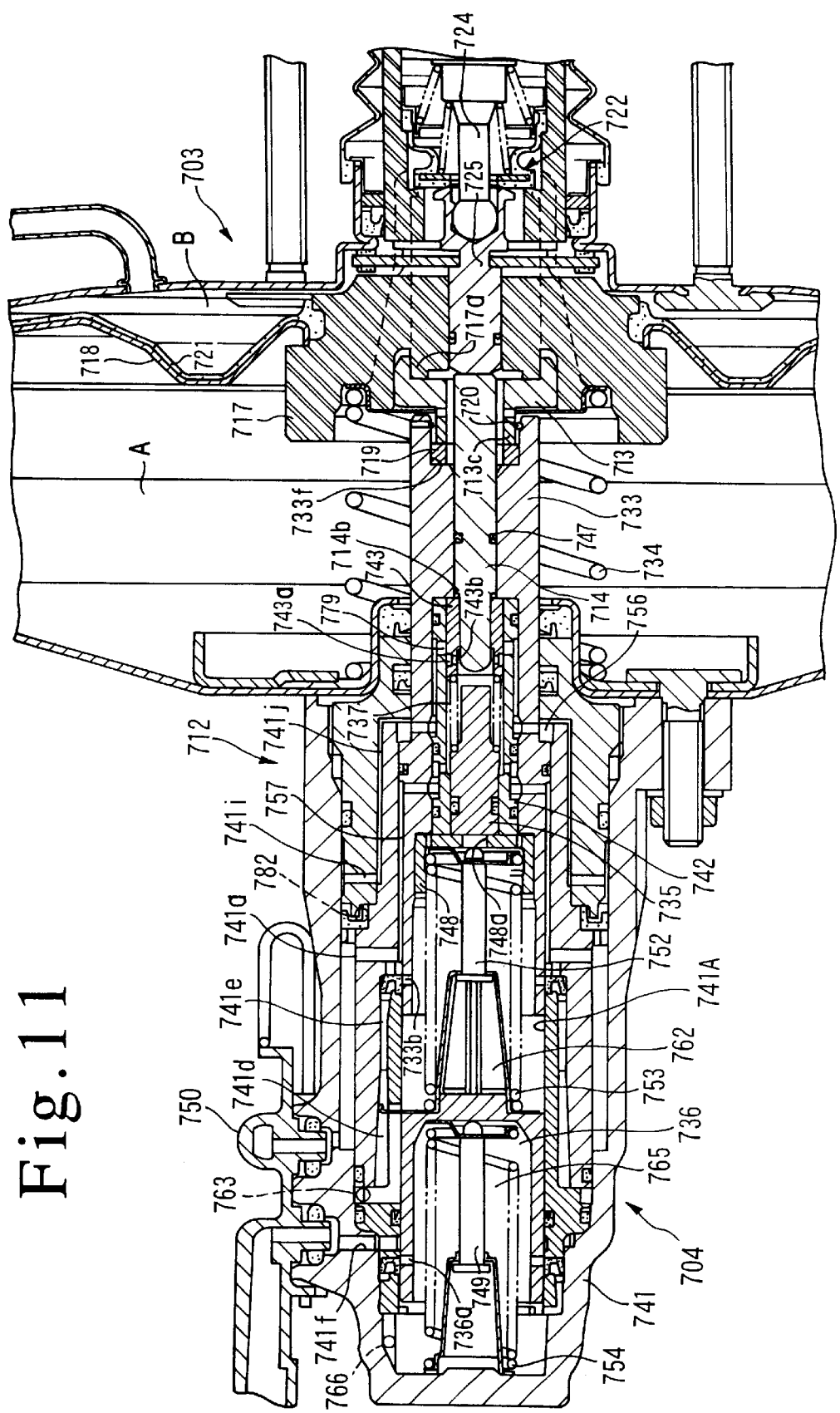
FIG. 11 is a cross section of a tenth embodiment of the invention.

FIG. 11 shows a tenth embodiment of the invention, which represents an improvement of the securing member 648 of the ninth embodiment shown in FIG. 10.

Specifically, in the tenth embodiment, a cup-shaped securing member 748 is used by disposing it as a press fit into the inner periphery of a primary piston 733 and disposing the rear end face of the securing member 748 in abutment against the front end of a sleeve 742, thus securing the sleeve 742 within the inner periphery of the primary piston 733. A reaction piston 735 has an end face which is supported by the end face of securing member 748. It will be noted that the end face of the securing member 748 is formed with a through-opening 748a, which provides a communication between spaces across the securing member 748.

In the tenth embodiment, a single seal member 747 is mounted around the outer periphery of an intermediate rod 714. It will be noted that in this embodiment, the configurations of a valve body 717 and a power piston 718 of a negative pressure booster 703 as well as an interconnection structure therebetween are slightly modified from those of the ninth embodiment shown in FIG. 10.

In addition, in this embodiment, a reservoir, not shown is forwardly spaced from a master cylinder 704, and accordingly, connection means 750 which is known in the art is employed to provide a communication between radial bores 741a and 741f formed through the master cylinder 704. In other respects, the arrangement is similar to the embodiment shown in FIG. 10, and accordingly, corresponding parts are designated by like reference numerals as used before, to which 100 is added, without repeating a detailed description.

The ninth embodiment constructed in the manner mentioned above achieves the similar functioning and advantages as those of the ninth embodiment mentioned above.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A brake system comprising a master cylinder defined in a housing for developing a master cylinder pressure as an associated master cylinder piston disposed therein advances, a negative pressure booster coupled to and actuated by a brake operating member to produce an output which is effective to cause the master cylinder piston to advance, and intensifying means for intensifying the master cylinder pressure by causing the master cylinder piston to advance, the arrangement being such that after the negative pressure booster reaches a full load point the master cylinder pressure is generated by a sum of a force with which the intensifying means causes the master cylinder piston to advance and a force with which the output from the negative pressure booster causes the master cylinder piston to advance, which sum is proportional to an input applied to the brake operating member, and the relationship between the master cylinder pressure and the input after the negative pressure booster reaches the full load point is the same as before the full load point is reached.

2. A brake system according to claim 1 in which a reaction piston responsive to the master cylinder pressure is disposed within the master cylinder to permit the master cylinder pressure to be transmitted as a brake reaction to the brake operating member through the reaction piston and the negative pressure booster.

3. A brake system according to claim 2 in which the negative pressure booster comprises a substantially tubular valve body slidably disposed within a shell, a power piston connected to the valve body to divide the interior of the shell into a constant pressure chamber and a variable pressure chamber, a valve plunger slidably fitted into the valve body and connected to the brake operating member through an input shaft, an atmosphere valve seat formed on the valve plunger, a vacuum valve seat formed on the inner periphery of the valve body, and a valve element disposed within the valve body for movement into engagement with or disengagement from the atmosphere valve seat and the vacuum valve seat, the reaction piston being disposed to be movable within the master cylinder piston, the master cylinder piston being coupled to the valve body of the negative pressure booster, an intermediate rod being slidably disposed between the reaction piston and the valve plunger, whereby a reaction from the master cylinder pressure which acts upon the reaction piston is transmitted to the brake operating member through the intermediate rod, the valve plunger and the input shaft.

4. A brake system according to claim 3, further comprising adjusting means disposed between the output transmitting member of the power piston and the master cylinder piston for adjusting the inoperative position of the master cylinder.

5. A brake system according to claim 3 wherein once the negative pressure booster exceeds the full load point, the input shaft and the valve plunger advance and via the intermediate rod cause the reaction piston to advance relative to the master cylinder piston to effectively increase the pressure in an intensifying chamber of the intensifying means and advance the master cylinder piston.

6. A brake system according to claim 3 in which a buffering member is disposed in a reaction transmission path through which the reaction is transmitted from the reaction piston to the brake operating member through the intermediate rod, the valve plunger and the input shaft.

7. A brake system according to claim 2 in which the intensifying means comprises an intensifying chamber defined within the housing for the master cylinder and facing the master cylinder piston, a pump for supplying a braking liquid to the intensifying chamber, and a control valve mounted on the master cylinder piston for throttling a braking liquid path which provides a communication between the intensifying chamber and a liquid pressure chamber of the master cylinder.

8. A brake system according to claim 7 in which the reaction piston also serves as a valve element of the control valve which throttles the braking liquid path.

9. A brake system according to claim 8, in which the pump is an anti-skid brake control pump.

10. A brake system according to claim 7 in which the negative pressure booster comprises a substantially tubular valve body, an input shaft, a vacuum valve seat formed on the inner periphery of the valve body, and a valve element disposed within the valve body for movement into engagement with or disengagement from the vacuum valve seat, and in which an axial travel of the input shaft from an inoperative position as a valve element of the control valve moves from an inoperative position to a complete closure of the braking liquid path is chosen to be greater than an axial clearance between the vacuum valve seat and the valve element which is adapted to move for engagement with or disengagement from the vacuum valve seat in the inoperative condition of the negative pressure booster.

11. A brake system according to claim 10, in which the pump is an anti-skid brake control pump.

12. A brake system according to claim 7 in which the master cylinder is of a tandem type including a primary piston facing the intensifying chamber and a secondary piston disposed forwardly of the primary piston, a difference between the pressure responsive area of the primary piston which faces the liquid pressure chamber and the pressure responsive area which faces the intensifying chamber is equal to the pressure responsive area of the secondary piston.

13. A brake system according to claim 7, in which the intensifying means is constructed such that the braking liquid in the braking liquid path, having been output from the liquid pressure chamber of the master cylinder, is boosted by the pump and then supplied to the intensifying chamber.

14. A brake system according to claim 7, in which the pump is an anti-skid brake control pump.

15. A brake system according to claim 2 in which the intensifying means comprises an intensifying chamber defined in the housing for the master cylinder and facing the master cylinder piston, a pump for supplying a braking liquid to the intensifying chamber, and a control valve mounted on the master cylinder piston for throttling a braking liquid path which provides a communication between the intensifying chamber and a reservoir.

16. A brake system according to claim 15, in which the intensifying means is constructed such that the braking liquid stored in the reservoir is boosted by the pump and supplied to the intensifying chamber.

17. A brake system according to claim 2, in which the intensifying means includes an intensifying chamber and a pump for supplying a braking liquid to said intensifying chamber, said system further comprising a switch for detecting an operation of the brake operating member, and a pressure sensor for detecting a pressure in a variable pressure chamber of the negative pressure booster, the pump being driven upon detection of the operation of the brake operating member and upon detection of a pressure in the negative pressure booster which is equal to or above a given pressure.

* * * * *